_United States Patent_ [15] 3,649,250
Dorenfeld et al. [45] Mar. 14, 1972

[54] SILVER RECOVERY PROCESS

[72] Inventors: Adrian C. Dorenfeld; Gust Bitsianes, both of Minneapolis, Minn.

[73] Assignee: Minerals Technology Corporation, Minneapolis, Minn.

[22] Filed: May 12, 1969

[21] Appl. No.: 823,983

[52] U.S. Cl. ............................................. 75/107, 75/118
[51] Int. Cl. .................................................. C22b 11/08
[58] Field of Search ................. 75/118, 105, 106, 107, 101, 75/108, 109; 23/183, 61; 260/430; 162/8

[56] References Cited

UNITED STATES PATENTS

| | | | |
|---|---|---|---|
| 1,281,249 | 10/1918 | Crowe | 75/106 |
| 1,397,684 | 11/1921 | Hahn | 75/106 X |
| 2,219,781 | 10/1940 | Lowe | 162/8 X |
| 2,273,569 | 2/1942 | Goette | 75/105 |
| 3,094,417 | 6/1963 | Workman | 96/28 |

Primary Examiner—L. Dewayne Rutledge
Assistant Examiner—G. T. Ozaki
Attorney—Merchant & Gould

[57] ABSTRACT

Silver is recovered from silver-containing scrap paper (e.g., scrap thermographic office copy paper) by a process which involves conditioning the silver-containing paper (e.g., with hot dilute aqueous sodium hydroxide) to thereby convert the silver in the paper from its usual organic acid salt form (e.g., silver behenate) into a different form of silver (e.g., converted into silver metal or some silver oxide) which is more readily converted into silver cyanide than is the organic acid salt of silver, and simultaneously or subsequently treating the new silver form with a silver-cyanide forming reagent (e.g., a dilute aqueous sodium cyanide solution) to thereby form silver cyanide. Metallic silver can then be recovered from the resulting silver cyanide solution by standard processing (e.g., zinc dust precipitation in the Merrill-Crowe process) as known in the art.

13 Claims, No Drawings

SILVER RECOVERY PROCESS

BACKGROUND OF THE INVENTION

In recent years, there has been an increasing trend toward the use of heat- and light-sensitive copy paper. Many papers of this type are characterized by surface coatings which contain silver, usually in the form of one of its solid, organic acid salts. Such silver-containing copy paper can contain varying amounts of silver. The amount of silver in such copy paper can range from 40 to 500 or more troy ounces per ton (i.e., per 2,000 pounds) of coated copy paper. Amounts of from 50–200 troy ounces per ton of coated paper are common.

Silver containing copy papers of this type are described in the prior art, and the following U.S. Pats. are mentioned for purposes of illustration:

No. 2,740,896  No. 2,910,377

No. 3,031,329  No. 3,080,254

No. 3,094,417  No. 3,094,619

As shown by these representative patents, silver-containing copy papers of this type are typically prepared by coating paper or some other suitable copy sheet with a normally solid organic acid salt of silver (e.g., silver behenate) and a reducing agent (e.g., 3,4-dihyroxybenzoic acid) which have been mixed in a resinous or polymeric film-forming binder (e.g., a polystyrene resin).

In the manufacture of such copy paper, a considerable amount of scrap paper is produced (e.g., as a result of making off-specification products, and as a result of cutting and trimming operations). Various processes (e.g., pyrolysis) have been used in efforts to reclaim the silver present in this scrap paper, but generally the processes are not economically and technically suited for the recovery of silver from scrap paper wherein the silver content of the paper is less than 150 troy ounces per ton of scrap paper. Consequently, the silver is not ordinarily reclaimed and the scrap paper is usually sold to paper dealers as scrap paper.

SUMMARY OF THE INVENTION

We have discovered a process whereby the silver present in such silver-containing scrap papers can be economically recovered, even at low silver contents, (e.g., 40–100 troy ounces of silver per ton of scrap paper).

Briefly described, our process involves the steps of:

a. Shredding, chopping, or otherwise reducing the scrap paper to a manageable size (e.g., pieces smaller than one square inch) if that is necessary;

b. Forming an aqueous slurry of the scrap paper;

c. Conditioning the slurry with heat, or a combination of heat and a chemical conditioning agent, to thereby convert the silver in the scrap paper into a different water immiscible form from which it can be readily converted into silver cyanide with an alkali cyanide;

d. Separating the resulting conditioned slurry into an aqueous phase and a water immiscible phase (e.g., paper pulp);

e. Treating the water immiscible phase with an alkali cyanide solution for a time sufficient to convert the silver into silver cyanide; and f. Thereafter recovering silver from the silver cyanide formed in (e) by standard processing (e.g., by zinc precipitation in the Merrill-Crowe process). Steps (c) (i.e., the conditioning step) and (e) (i.e., the silver cyanide forming step) can be performed sequentially as shown or can be performed simultaneously. If the steps are performed simultaneously, it is possible to condition the silver-containing paper by the use of heat (e.g., 65°–85 C.) in the presence of the alkali cyanide (e.g., aqueous sodium cyanide) and without the need for any chemical conditioning agent. However, if the steps are performed sequentially, the use of a chemical conditioning agent (e.g., sodium hydroxide) is preferred because it permits a greater degree of silver recovery. The use of a chemical conditioning agent in the combination process offers the added advantage of producing a sparkling white paper residue (as a byproduct of this process).

DETAILED DESCRIPTION

The silver recovery process of this invention is hereinafter described with emphasis on the recovery of silver by a sequence of steps that involve the conditioning or pretreating of an aqueous slurry of the scrap paper (preferably with heat and a chemical conditioning agent) and the subsequent step of leaching or extracting silver from the conditioned paper with an alkali cyanide. However, the process can also be carried out as a combination process in which the conditioning of the paper and silver extraction are simultaneously performed by heating an aqueous slurry of scrap paper and alkali cyanide. The combination process offers certain processing and economic advantages over the sequential procedure. The combination process is described in more detail, infra, following the description of the sequential process.

The silver-containing paper

The present invention is applicable to the recovery of silver from all types of silver-containing paper (or other copy sheets). Of course all papers are not alike, and the process should be optimized for any particular paper that is used. The process is particularly applicable to the recovery of silver from heat-sensitive copy paper of the type described in the patents previously mentioned herein. Such preferred paper characteristically has a heat- or light-sensitive coating which contains a silver salt of a fatty acid (e.g., silver behenate) and a suitable reducing agent, together with optional additives.

Although the process can be applied to scrap paper containing large amounts of silver (e.g., 600 troy ounces per ton of scrap paper), it is particularly well suited for the recovery of silver from scrap paper containing less than 150 troy ounces of silver per ton of scrap paper. Scrap paper containing from 40–100 (e.g., 60–90) troy ounces per ton of scrap paper can be efficiently processed by our scrap recovery process.

As used herein, a troy ounce equals 31.1 grams and a ton equals 2,000 pounds (i.e., 907.2 kilograms).

It is not essential that the scrap paper which is treated by our process be shredded, chopped, or otherwise reduced in size. However, the process is significantly more efficient when applied to scrap paper which has been shredded, chopped, pulped or otherwise reduced to a small size.

The conditioning step

The conditioning step or treatment of the silver-containing paper is performed by heating an aqueous slurry of the scrap paper (e.g., 15 parts of water to one part of paper, by weight), in the optional presence of a chemical conditioning agent, to convert the silver in the paper into a new form (e.g., converted from silver behenate to silver or a silver oxide) from which the silver can be readily converted into silver cyanide.

This conditioning or heating step is an essential part of our process. We have not been able to efficiently and economically extract silver from scrap paper (e.g., present as silver behenate) with alkali cyanide solutions at room temperature as might generally by expected. Unless the alkali cyanide solution is heated above 60° C. (e.g., to 65°–85° C.) or unless the scrap paper is preconditioned with heat or, more preferably, heat and one or more chemical conditioning agents (e.g., sodium hydroxide), efficient extraction of the silver is not obtained. Heating alkali cyanide solutions to extract silver is not common since alkali cyanide techniques are generally effective at room temperature (e.g., 20°–25° C.) and alkali cyanides (e.g., NaCN) are poisonous.

Water can be added to the scrap paper to form a slurry which is thereafter heated or the paper can be added to heated water (e.g., water at 80° C.). If desired, a chemical conditioning agent can be used in the form of an aqueous solution (e.g., hot dilute aqueous sodium hydroxide) to provide all or part of the water needed to achieve a manageable aqueous slurry of the scrap paper.

If a chemical conditioning agent is not used, the silver-cyanide-forming step is desirably performed simultaneously with the heating or conditioning step because the alkali cyanide solution (e.g., sodium cyanide solution) used to form the silver cyanide seems to perform the functions of a chemical conditioning agent provided it is heated (e.g., heated to more than 65° C.). We prefer to use chemical conditioning agents during the heating step because of the improved results which are obtained.

The chemicals which can optionally be used in the conditioning of the scrap paper include all chemicals and mixtures of chemicals which, under the conditions of the conditioning step, are capable of converting the silver in the silver-containing scrap paper into a different form of silver (usually a different water insoluble form) from which the silver can readily be converted into silver cyanide with an alkali cyanide. Although silver cyanide (AgCN) is water insoluble, it is soluble in alkali cyanide solutions (e.g., KCN). In aqueous alkali cyanide solutions (e.g., NaCN) silver cyanide is believed to be present as the corresponding sodium salt, i.e., Na [Ag(CN)$_2$], which is water soluble. We have found that sodium hydroxide is particularly well suited as a conditioning agent and we prefer its use. Other materials which can be used as conditioning agents are sodium silicate, soda ash, potassium hydroxide, potassium silicate, formic acid, Na$_2$HPO$_4$·7 H$_2$O, ammonium carbonate, Na$_2$S·9 H$_2$O, Na$_4$P$_2$O$_7$·10H$_2$O, and sodium metasilicate. Among the various materials which we have tried which are not effective as conditioning agents under the conditions of our testing are sodium thiosulfate, oxalic acid, and various calcium, barium and magnesium salts (e.g., calcium hydroxide). By way of example, when we have used 5 percent aqueous sodium hydroxide as the conditioning agent at temperatures of 70°–100° C. and thereafter extracted the conditioned paper with alkali cyanide solutions (e.g., 0.5 percent aqueous sodium cyanide) at room temperature (i.e., 20°–25° C.), we have been able to recover or extract more than 90 percent of the silver present in the untreated scrap paper. By contrast, when we have proceeded without effectively conditioning the scrap paper, we have typically recovered less than 50 percent of the silver present in the untreated scrap paper (e.g., recovered 10–20 percent of the silver).

The temperature of conditioning can vary and is dependent upon such factors as the type of scrap paper, the degree of dilution, the strength and type of the conditioning agent, and the like. In general, we have found that conditioning temperatures above 60° C. are desirable, and temperatures of from 65°–100° C. (e.g., 70°–85° C.) are normally effective. Higher temperatures (e.g., 110° C.) can be used, but are not needed.

The aqueous slurry of scrap paper should be heated, desirably with a conditioning agent or in the presence of an alkali cyanide, for a time sufficient to convert the silver in the scrap paper from its salt or soap form into a different form from which it can be readily converted into silver cyanide by means of an alkali cyanide. Ordinarily, this conversion of of the silver can be visually observed by noting the change in color of the scrap paper from a normally white color to black. When we have used hot dilute aqueous sodium hydroxide for conditioning we have found that the scrap paper will turn black almost immediately after being added to the hot (e.g., 75° C.) solution.

In general, we prefer that the conditioning agent be used at such concentrations and in such amounts as to completely blacken the scrap paper in less than 1 hour (e.g., in less than 30 minutes), and preferably to blacken the paper in less than 5 minutes.

Separation of the conditioned paper

After conditioning the paper (assuming the process to be run sequentially and not simultaneously with the cyanide treatment), the slurry of scrap paper is desirably decanted or filtered to separate the aqueous phase from the water insoluble or immiscible phase.

We have determined analytically that when our process is run properly (as illustrated by the examples which follow), the aqueous phase or filtrate contains very little silver and most of the silver originally present in the untreated scrap paper remains in the water immiscible phase which is typically a wet, pulpy blackish mixture of paper and conditioned silver. For this reason, it is advantageous to make this separation. Then, the aqueous phase (which typically amounts to more than one-half of the slurry) can be recycled for further use or discarded.

The cyanide step

Next, the water immiscible phase is treated with an aqueous solution of an alkali cyanide. Suitable alkali cyanides include sodium cyanide and potassium cyanide. Aqueous sodium cyanide is preferred. The water-immiscible phase and the cyanide are permitted to react to thereby convert the silver into a silver cyanide which is soluble in aqueous alkali cyanide. With mild agitation at room temperature, the conversion of the conditioned silver into its corresponding silver cyanide is usually quite rapid and can normally be accomplished in less than 30 minutes. However, under some circumstances, this conversion can require up to 24 hours or longer (e.g., 0.5–6 hours). The pregnant solution is then separated from the paper residue (e.g., by decantation or filtration).

The silver recovery step

Metallic silver is then recovered from the pregnant silver cyanide/alkali cyanide solution by standard techniques which are known to the art (e.g., the Merrill-Crowe process). For example, it is known that silver can be recovered from aqueous alkali cyanide solutions by the addition of finely divided zinc powder (i.e., zinc dust) to a pregnant solution which has been clarified and deoxygenated. This addition of zinc powder results in the precipitation of metallic silver from solution. The silver and zinc can then be separated by known techniques (e.g., smelting).

The combination process

As previously indicated, the steps of conditioning the scrap paper and extracting the silver with an alkali cyanide can be combined and carried out simultaneously. For example, the process can be carried out by heating an aqueous slurry of scrap paper at 85° C. in the presence of a mixture of sodium hydroxide and sodium cyanide. The results obtained by the combination process are substantially the same (in terms of silver recovery) as those obtained by the sequential process.

The combination process can be carried out in the absence of any chemical conditioning agent, but silver recovery is generally lower than when a chemical conditioning agent is used. We believe that the reason why alkali cyanide solutions work without any chemical conditioning agent present is that alkali cyanides form basic solutions at elevated temperatures (e.g., 85° C.)

After the silver has been extracted from the scrap paper by the combination process, the silver can be recovered in the manner previously indicated (e.g., separation of the pregnant liquor from the pulpy residue followed by zinc dust precipitation in the Merrill-Crowe process).

General Information

The pregnant solutions from leaching some silver bearing papers (e.g., certain thermographic office paper) contain soaps and other organic materials (e.g., behanates), in amounts which interfere with efficient precipitation of silver. These pregnant solutions are usually yellowish and turbid. Upon the addition of sufficient quantities of a suitable metal salt (e.g., calcium chloride) a metal soap can be precipitated and coagulated, leaving a clear solution. This solution is ready for treatment by the standard Merrill-Crowe process.

The barren solution, obtained after precipitation of the silver, can be recycled in the process.

Another method for silver recovery from silver cyanide solution is to oxidize the cyanide to $CO_2$ and $N_2$, by the addition of hypochlorite salts, thus precipitating the silver.

The present invention will be further understood by reference to the following specific examples which include a preferred embodiment. Unless otherwise indicated, all parts and percentages are by weight.

EXAMPLES 1-5

These examples illustrate the conditioning of silver-containing scrap paper with heat and a chemical conditioning agent (sodium hydroxide). The examples demonstrate the effect of temperature on conditioning.

In each example, 375 ml. of 0.5 percent aqueous sodium hydroxide was heated to the designated temperature and 25 grams of scrap paper (3M type 209-B) was then added. The resulting slurry was then agitated while maintaining the designated temperature, and visual observations of the slurry were recorded.

Example 1 was run at 50° C. No blackening of the paper was observed in the first 5 minutes of conditioning. After 15 minutes, a few pieces had blackened. The test was discontinued. However, it is expected that complete blackening of the paper would have eventually occurred.

Example 2 was run at 60° C. Blackening of the paper was observed in 2-3 minutes. After 5 minutes, all of the paper was gray-black. After 15 minutes, the paper had turned a dark gray-black.

Example 3 was run at 70° C. Blackening of the paper was noted in 10-20 seconds. After 15 minutes, the paper had all turned a good, even black.

Example 4 was run at 75° C. Blackening occurred in 5 seconds. After 15 minutes, the paper had all turned a good even black.

Example 5 was run at 80° C. and blackening occurred in 3-5 seconds. After 15 minutes, the paper had all turned a good, even black.

EXAMPLE 6

One hundred fifty eight grams of chopped, scrap thermographic copy paper, containing 82.5 troy ounces of silver per ton of scrap paper was added to 2,500 ml. of 1 percent aqueous sodium hydroxide solution and heated. When the temperature reached approximately 75° C., the scrap paper turned black on one side. The heating was continued until the solution boiled (at approximately 97° C.). Boiling was continued for 5 minutes. The mixture was cooled and filtered. Approximately 1,950 ml. of a brownish-yellow cloudy filtrate were obtained. The wet residue was washed with 400 ml. of water.

For purposes of later testing the feasibility of recycling chemicals, the filtrate, wash water, 200 ml. of fresh water, and 3.6 grams of sodium hydroxide were mixed and used to condition additional scrap silver-containing copy paper (not part of this example).

Next, the wet residue was agitated for 17 hours at room temperature with 1,900 ml. of water and 6 grams of sodium cyanide. The resulting material was then filtered in a Buchner funnel to thereby obtain 1,900 ml. of a fairly clear, pregnant solution and a wet paper residue which was saved for later assay. Silver was then recovered from the pregnant cyanide solution by zinc dust precipitation.

The zinc dust precipitation of the silver from the pregnant cyanide solution was performed as follows: Each 500 ml. portion of pregnant cyanide solution was filtered through 0.3 cm. depth of a filter aid (Johns Mansville's Celite) on a No. 4 Whatman paper to obtain a very clear pregnant cyanide solution. The clear pregnant solution was then agitated for 10 minutes under a vacuum of 700 mm. Hg. Next, 0.5 grams of zinc dust were added and the resulting mixture agitated for 1 hour under the same vacuum. This mixture was then filtered on No. 4 Whatman paper. The silver was recovered by fire-assay methods as known in the art.

The remaining sodium cyanide solution was rendered innocuous by treatment with sodium hypochlorite and sodium hydroxide.

The recovery of silver by this technique was in excess of 80 percent based on the original silver content of the untreated scrap paper. The wet paper residue (yellowish in color) from the cyanide treatment was then assayed for silver content and found to contain 5.8 percent of the silver originally present in the untreated scrap paper. The remaining traces of silver were lost during processing.

EXAMPLE 7

A large batch of scrap silver bearing paper (Minnesota Mining and Manufacturing Company type 209) was homogenized by shredding, chopping and mixing. This paper contained about 62 troy ounces of silver per ton of paper. Twenty five grams of this homogenized paper was then added to a mixture of 500 ml. of water and 5 grams of sodium carbonate. The resulting mixture was then heated to boiling and heating was discontinued. On heating, the paper began to blacken rapidly at about 70° C. The scrap paper turned completely black in less than 10 minutes. This mixture was then filtered on a Buchner funnel and the wet residue was washed twice with 600 ml. portions of water (each time, the wet residue was repulped and refiltered). The wet residue, after pressing to remove a substantial portion of the remaining water, weighed approximately 52 grams. Next, this wet residue was mixed with 475 ml. of water and 3.75 grams of sodium cyanide. The resulting mixture was then stirred with a mixer in a beaker for approximately one-half hour. The mixture was then filtered in a Buchner funnel and 430 ml. of filtrate (i.e., the pregnant cyanide solution) was obtained. The pulpy residue was then pressed through rolls to remove more water. During rolling, 27 ml. of water was removed. The residue was dried at about 105° C. for ten hours. This paper residue weighed 23.5 grams. The paper residue (yellowish in color) was assayed and contained 6.8 Troy ounces of silver per ton. The silver extraction was, therefore, about 89 percent.

EXAMPLES 8-13

A series of six experiments were performed to demonstrate the differences in the extent of silver extraction caused by using various concentrations of alkali cyanide.

In each of these six examples, a 25 gram sample of the homogenized copy paper described in example 7 was conditioned for 15 minutes at 80° C. in approximately 375 ml. of 0.5 percent aqueous sodium hydroxide. After conditioning for approximately 15 minutes, the aqueous slurry of conditioned paper (now black in color) was cooled to room temperature in a water bath. Next solid sodium cyanide was added to the conditioned paper slurry at room temperature in amounts sufficient to provide the concentrations hereinafter set forth. The resulting mixture was then shaken vigorously for 30 minutes at room temperature, followed by filtration on a Buchner funnel with vacuum assistance. The resulting filter cake was then washed with two water washes of 100 ml. each. The filter cake was then pressed through rollers at 1,000 p.s.i. to remove additional liquids. The filter cake was then assayed. The silver extraction, based on fire-assay methods was determined by difference.

In Example 8, the concentration of sodium cyanide was 0.5 percent. Silver extraction was approximately 95 percent.

In Example 9, the sodium cyanide concentration was 0.25 percent. Silver extraction was approximately 95 percent.

In Example 10, the sodium cyanide concentration was 0.1 percent. Silver extraction was approximately 95 percent.

In example 11, the sodium cyanide concentration was 0.05 percent. Silver extraction was approximately 95 percent.

In example 12, the sodium cyanide concentration was 0.025 percent. Once again, silver extraction was approximately 95 percent.

In example 13, the sodium cyanide concentration was 0.01 percent. In this instance, the silver extraction dropped to approximately 42 percent.

In each of these examples, the pulpy residues were various shades of yellow.

EXAMPLE 14

One hundred grams of homogenized scrap silver-containing copy paper was added to 1,500 ml. of hot water (85° C.) which contained 0.5 percent sodium hydroxide and 0.5 percent sodium cyanide (based on the weight of the 1,500 ml. of hot solution). The homogenized pulp was agitated in this hot water for 1 hour. During this time, the hot water was permitted to cool. At the end of the hour, the temperature had reached approximately 40° C. The slurry was then filtered through a Buchner funnel under vacuum. One thousand and fifty milliliters of a yellowish, turbid, pregnant solution was obtained.

Next, the pulpy residue was washed with three water washes (450 ml.). The first was water (after washing) was then added to the pregnant solution.

The pulpy residue was then dried for 11 hours at approximately 70° C. The dry weight of the paper residue was 87.5 grams. Upon assay, it was found to contain 1.6 ounces of silver per ton of paper.

Next, 2.25 grams of calcium chloride was added to 500 ml. of the pregnant solution (to which had been added the first was water). A precipitate formed and coagulated. This precipitate was filtered through a No. 4 Watman paper. The filtrate was clear. The precipitate retained by the filter paper was then washed with five water washes (10 ml.). All of the wash water was then added to the original filtrate. The coagulated precipitate was then assayed for silver, but did not contain any significant amounts of silver.

Next, 110 ml. of the filtrate (i.e., the clarified pregnant solution) was placed in a vacuum flask and deaerated under 700 mm. Hg vacuum with agitation until the bubbling which was first observed had ceased. Then, 200 mg. of zinc dust was added to the deaerated filtrate and stirred for approximately five minutes under the vacuum. A metal precipitate formed. The metal precipitate was filtered in a Buchner funnel through No. 4 Watman paper. The filter cake was then boiled with 80 ml. of 2 percent hydrochloric acid solution to dissolve the zinc metal in the filter cake. After boiling, the mixture was cooled and filtered as before. The filter cake recovered from this filtration was then fire-assayed. This filter cake was found to contain 14.78 mg. of silver.

Subsequent analysis showed that each 100 ml. of the pregnant solution contained 16.15 mg. of silver. Therefore, the recovery of the silver from the pregnant solution was approximately 92 percent.

The pulpy paper residue which remained was very white when compared with the pulpy paper residues obtained in the previous examples.

What is claimed is:

1. The process of recovering silver from paper which is coated with a silver-containing coating, said process comprising the steps of:
  a. forming an aqueous slurry of paper having a coating thereon that contains an organic acid salt of silver;
  b. conditioning said slurry by heating it above 60° C. in the presence of a chemical conditioning agent selected from the group consisting of sodium hydroxide, sodium silicate, soda ash, potassium hydroxide, potassium silicate, formic acid, disodium phosphate, ammonium carbonate, sodium sulfide and tetra sodium phosphate to thereby convert said silver into a form from which the silver can be readily converted into silver cyanide with an alkali metal cyanide;
  c. treating the conditioned slurry with an alkali metal cyanide to convert the silver into a silver cyanide; and
  d. thereafter recovering silver from the silver cyanide.

2. The process of claim 1 wherein said conditioning agent comprises sodium hydroxide, wherein the conditioning of step (b) is performed prior to the treating of step (c), said conditioning being performed at a temperature of about 70°–85° C.

3. The process of claim 2 wherein the alkali metal cyanide comprises sodium cyanide.

4. The process of claim 3 wherein the silver present in the untreated paper is present as a fatty acid salt of silver.

5. The process of claim 3 wherein the silver in the paper is present as silver behenate and wherein the conditioning of step (b) is continued until the paper is blackened.

6. The process of claim 3 wherein the silver present in the untreated paper is present as silver behenate.

7. The process of claim 6 wherein at least part of the water needed for forming the slurry of step (a) is provided by using aqueous sodium hydroxide as the conditioning agent of step (b).

8. The process of claim 6 wherein the silver is recovered by zinc dust precipitation of a pregnant cyanide solution formed during step (c).

9. The process of claim 1 wherein the conditioning of step (b) is performed simultaneously with the treating of step (c).

10. The process of claim 9 wherein the conditioning and treating are performed simultaneously by heating the aqueous slurry of paper to a temperature of 70°–85° C. in the presence of sodium cyanide and sodium hydroxide.

11. The process of recovering silver from paper which is coated with a silver-containing coating, said process comprising:
  a. forming an aqueous slurry of a heat sensitive copy paper having a coating thereon which includes silver behenate;
  b. heating the slurry above 60° C. in the presence of sodium hydroxide for a time sufficient to blacken the paper;
  c. separating an aqueous phase from the blackened paper;
  d. contacting the blackened paper with aqueous sodium cyanide to extract silver from the blackened paper; thereby forming a solution pregnant with silver; and
  e. thereafter recovering silver from said pregnant solution.

12. The process of claim 11 wherein the extraction of silver with sodium cyanide is performed at about room temperature.

13. The process of claim 11 wherein silver is recovered by zinc dust precipitation of the pregnant cyanide solution of step (d).

* * * * *